ated Aug. 5, 1969

United States Patent Office 3,459,828
Patented Aug. 5, 1969

3,459,828
EPOXY RESINS CONTAINING A POLYGLYCIDYL ETHER AND THE REACTION PRODUCT OF AN HYDROXY TERMINATED MONOGLYCIDYL ETHER WITH A DIISOCYANATE
Francis W. Michelotti and Morris Zief, Easton, Pa., assignors to J. T. Baker Chemical Company, Phillipsburg, N.J., a corporation of New Jersey
No Drawing. Filed Mar. 13, 1967, Ser. No. 622,410
Int. Cl. C08g *30/00, 45/06*
U.S. Cl. 260—830                          9 Claims

ABSTRACT OF THE DISCLOSURE

In the preparation of diepoxides of the following Formula I there is inherently produced minor quantities of the monoepoxy compounds of the following Formula II which have a free hydroxyl group. Reaction in situ of the free hydroxyl with a diisocyanate produces diepoxides of Formula III. This mixture of diepoxides, on subsequent curing, has a lower water absorption while retaining desirable properties of cured compositions of the mixture of the Formulae I and II compounds:

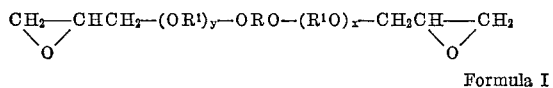

Formula I

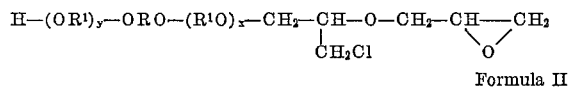

Formula II

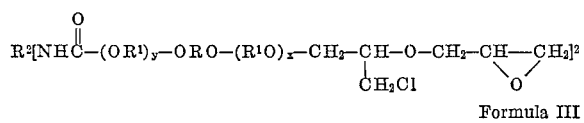

Formula III wherein each R is the organic residue of a diphenol, $R^1$ is 1,2-ethylene or alkyl-substituted 1,2-ethylene having a total of not more than 4 carbon atoms, each of $y$ and $x$ is an integer of 1 to about 20, and $R^2$ is the organic residue of a diisocyanate.

BACKGROUND OF THE INVENTION (1) Epoxy resins and polymerized products thereof which have low water absorption.

(2) U.S. Patent 3,239,580, which issued to E. L. Pendelton et al. on Mar. 8, 1966, and application Ser. No. 545,880, filed on Apr. 28, 1966, now abandoned, in the names of Morris Zief et al.

SUMMARY OF THE INVENTION

This invention relates to epoxy resins and polymerization products thereof. More particularly this invention relates to compositions comprising a mixture of the compounds of Formulae I and III and cured products thereof.

We have found that in preparing compounds of the above Formula I, there is coproduced minor quantities, i.e. about 5% to 25% of compounds of Formula II. Although this mixture of compounds alone or in admixture with other polyepoxy compounds can be polymerized with epoxy crosslinking agents to produce polymers having desirable properties, they have relatively high water absorption. We have also found that by reacting the free hydroxyl groups of compounds of Formula II with organic diisocyanates, the compounds of Formula II are converted to compounds of Formula III and the thus obtained mixture of Formulae I and III compounds can be polymerized to useful products such as sealants, adhesives, and the like which have a lower water absorption as compared to the polymerization product of the mixture of compounds of Formulae I and II.

It is an object of this invention to provide diepoxides which can be formulated and cured either alone but preferably with other epoxy resins to produce thermoset resins having a desirable combination of good elongation, high tensile strength and low water absorption.

DETAILED DESCRIPTION OF THE INVENTION

The term "epoxide" or "epoxy" refers to the oxirane group:

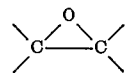

and preferably to the oxirane group:

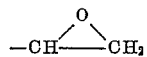

The term "organic residue of a diphenol" refers to a diphenol exclusive of the hydroxyl groups.

The term "organic residue of a diisocyanate" refers to an organic diisocyanate exclusive of the isocyanate groups.

The diphenol can be represented by the formula HO—R—OH wherein R, the organic residue of a diphenol, can be mononuclear or polynuclear. Illustrative of mononuclear diphenols there can be mentioned: resorcinol; hydroquinone; catechol; orcinal; dihydroxyxylol; resorcinol; and the like. Illustraitve of polynuclear phenols there can be mentioned: bis(4-hydroxyphenyl)dimethylmethane; p, p'-dihydroxybenzophenone; p,p'-dihydroxydiphenol; p,p'-dihydroxydibenzyl; p,p'-dihydroxyphenyl sulfone; the 2,2', 2,3' and 2,4' - dihydroxydiphenyldimethylmethane; dihydroxydiphenylethylphenylmethane; dihydroxydiphenyltolylmethylmethane; dihydroxydiphenyldicyclohexlmethane; β,β'dihydroxydinaphthylmethane; various long-chain bisphenols; and the like. The diphenols can have various substituents, e.g., alkyls such as methyl, halogens such as chlorine, and the like. Preferably the organic residue of the diphenol (as represented by R of the generic Formula I) is a polynuclear hydrocarbon such as that obtained from bis(4-hydroxyphenyl)dimethylmethane. The organic residue of bis(4-hydroxyphenyl)dimethylmethane can be represented by the formula:

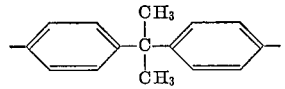

Each of the aliphatic divalent $R^1$ groups can have from 2 to about 4 carbon atoms. The $R^1$ groups are a part of the novel diepoxide chain through an ethylene (—$CH_2$—$CH_2$—)

linkage, e.g., 1-methyl-1,2-ethylene or 2-methyl-1,2-ethylene as can be represented by the formula:

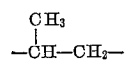

As stated hereinbefore each of $x$ and $y$ in the above generic formulae are integers from 1 to about 20. Preferably each of $x$ and $y$ is an integer from 3 to about 15.

The diisocyanate may be any organic aliphatic or aromatic diisocyanate, e.g. hexamethylene diisocyanate, 4,4'-methylene bis(phenyleneisocyanate) and tolylene diisocyanate.

The method for preparing compounds of Formula I together with minor quantities of the compound of Formula II which are coproduced is fully disclosed in patent application Ser. No. 545,880. Briefly, however, their method of preparation is described hereinafter.

The compounds of Formulae I and II are prepared by first preparing a diol of the diphenol compound, then preparing a dihalohydrin, which simultaneously also gives minor quantities of monohalohydrin and finally dehydrohalogenating the halohydrin groups to form epoxy groups. The diol is prepared by reacting a diphenol with an alkylene oxide in the presence of a basic catalyst such as caustic alkali. Illustrative of the alkylene oxides which are reacted with the diphenol, there can be mentioned: ethylene oxide; 1,2-propylene oxide and 1,2-butylene oxide. The diol is then reacted with an epihalohydrin, e.g., epichlorohydrin in the presence of a catalyst, e.g., boron trifluoride or stannic chloride to prepare the dihalohydrin with minor quantities of the monohalohydrin. The dihalohydrin can be represented by the following Formula IV, whereas the monohalohydrin is represented by the following Formula V. The quantity of the Formula IV dihalohydrin can be about 75% to 95%, by weight, of the mixture of the compounds of Formulae IV and V and more generally from about 80% to 90% of the mixture; whereas the quantity of the Formula V compound is correspondingly from 5% to 25% and more generally from about 10 % to 20% by weight of this mixture.

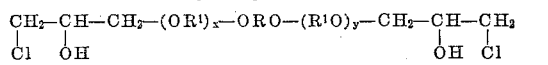

Formula IV

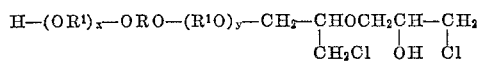

Formula V

The dehydrohalogenation reaction of the halohydrins to produce the mixture of compounds of Formulae I and II is readily accomplished by treating the halohydrins with an acid acceptor such as sodium hydroxide. Finally, the free hydroxyl groups of the Formula II compounds are reacted with an organic diisocyanate to produce the compounds of Formula III. This reaction is conducted in situ in the mixture of di- and monoglycidyl ethers prepared after the dehydrohalogenation. In preparing the mixture of compounds of Formulae I and III, a diisocyanate in a quantity sufficient to provide about 0.5 to 1.5 isocyanate groups per hydroxyl group and preferably about 0.5 to 1.0 isocyanate groups per hydroxyl group, is added to the mixture of compounds of Formulae I and II with stirring to effect an intimate admixture. Preferably, the reaction mixture is maintained at a temperature of about 50° C. to about 150° C. during the reaction, e.g., for about 0.25 hour to about 5 hours.

The diepoxide mixture of Formulae I and III is preferably a liquid at room temperature, e.g., having a Brookfield viscosity of about 2,000 to 15,000 centipoises (cps.) at 25° C. This epoxide mixture can be cured with epoxy cross-linking agents to yield a broad variety of valuable polymers.

The quantity of cross-linking agent employed will vary depending on the cross-linking agent employed. Generally, it will be in the range between about 0.001 and 20 weight percent based on the total weight of the polymerizable material in a composition, with between about 0.01 and 15 weight percent being the preferred weight range. Suitable cross-linking agents include polymerization catalysts such as various acids, e.g., sulfuric acid, alkanesulfonic acids, benzenesulfonic acid, perchloric acid, phosphoric acids, and the like; metal halide Lewis acids and their complexes, such as stannic chloride, stannic bromide, ferric chloride, aluminum chloride, zinc chloride, boron trifluoride, boron trifluoride-ether complexes, boron trifluoride amine complexes, e.g., boron trifluoridemonoethylamine complex, boron trifluoride-piperidine complex, and the like; bases such as sodium hydroxide, alkali metal alcoholates, tertiary amines, e.g., benzyldimethylamine, dimethylaminomethylphenol, triethylenediamine, 2,4,6-tri(dimethylaminomethyl)phenol, and the like; alkyl titanates such as tetraisopropyl titanate, tetrabutyl titanate, and the like; and other similar catalysts having curing activity. Additional cross-linking agents include reactive polyfunctional materials such as polycarboxylic acid halides, polyhydric alcohols, polythiols, polyfunctional amines and the like. The polymerized compositions are prepared from the polymerizable compositions by simply admixing the various ingredients but preferably with the application of heat, e.g., heating at a temperature of from about 30°–150° C. Particularly useful polymerizable compositions and polymerized resinous compositions are the following:

(1) Polymerizable and polymerized compositions can be prepared from admixtures which comprise (a) a novel mixture of diepoxides of this invention and (b) a polyfunctional amine, i.e., an amine having at least two active amino hydrogen atoms which can be on the same nitrogen atom or different nitrogen atoms, in an amount sufficient to provide between about 0.2 to 4.0 amino hydrogen atoms per epoxy group of said novel mixture of diepoxides and preferably between about 0.5 and 2.0 amino hydrogen atoms per epoxy group. Suitable polyfunctional amines include monoamines, diamines, triamines, and higher polyamines such as 2-ethylhexylamine, aniline, phenethylamine, cyclohexylamine, 2-aminophenol, 1,3-diamino - 2 - propanol, ethylenediamine, butylenediamine, xylylenediamine, hexamethylenediamine, p-phenylenediamine, guanidine, p,p'-bisaminophenylsulfone, p,p'-methylenedianiline, bisaniline-F, aminoethylpiperazine, and the like.

(2) Polymerizable and polymerized compositions can be prepared from admixtures which comprise (a) novel mixture of diepoxides of this invention, (b) a polycarboxylic acid anhydride in an amount sufficient to provide about 0.2 to 4.0, preferably from about 0.5 to 2.0 anhydride carboxyl group per epoxy group. Illustratively, the anhydrides of the following acids are suitable. Aliphatic, aromatic, and cycloaliphatic polycarboxylic acids such as oxalic acid, malonic acid, glutaric acid, maleic acid, suberic acid, citraconic acid, 1,2-cyclohexanedicarboxylic acid, phthalic acid, 1,8-naphthalenedicarboxylic acid, 3-carboxycinnamic acid, 1,2,4-butanetricarboxylic acid, 1,2,4-hexanetricarboxylic acid, 1,2,4-benzenetricarboxylic acid, and the like; polycarboxy polyester, i.e., polyesters containing more than one carboxy group per molecule, such as polycarboxylic acids of the type exemplified above, or the corresponding anhydrides, esterified with polyhydric alcohols which include ethylene glycol, diethylene glycol, triethylene glycol, tetraethylene glycol, propylene glycol, 1,6-hexanediol, trimethylolpropane, pentaerythritol, dimethylolphenol, inositol, polyvinyl alcohols, and the like.

(3) Polymerizable and polymerized compositions can be prepared from admixtures comprising (a) novel mixture of diepoxides of this invention and (b) a polyol, i.e., an organic compound having at least two hydroxyl groups which are alcoholic hydroxyl groups, phenolic hydroxyl groups, or both alcoholic and phenolic hydroxyl groups, e.g., aliphatic and cycloaliphatic polyalcohols and polyhydric phenols. The polyol is employed in an amount which provides between about 0.2 and 4.0 hydroxyl equivalents per epoxy equivalent of said diepoxides. These compositions can be further modified by incorporating therein a polycarboxylic acid compound or polycarboxylic acid anhydride such as those illustrated in section (2) above. Typical polyols which can be employed include ethylene glycol, diethylene glycol, glycerol, polypropylene glycols, butanediol, triethanolamine, pentaerythritol, trimethylolethane bis(4-hydroxyphenyl)methane, inositol, sorbitol, trimethylolphenol, resorcinol, pyrogallol, hydroquinone, 1,8-naphthalenediol, 2,4,6-trimethylolphenol allyl ether, cyclohexanediol, and the like.

(4) Polymerizable and polymerized compositions can be prepared from admixtures comprising (a) novel mixture of diepoxides of this invention and (b) any one of the following classes of compounds, namely, polythiols such as the sulfur analogs of the polyols listed in section (3) above, phenol-aldehyde condensates, urea-aldehyde condensates, melamine-aldehyde condensates, polyamines, polycarboxylic acid halides, and the like.

(5) Preferably, the polymerizable compositions of this invention and the resins produced therefrom are those of a novel mixture diepoxide of this invention (i.e., compounds of Formulae I and III) and a diepoxy resin which normally produces a rigid polymer on curing together with a reactive cross-linking agent for epoxy compounds. The ratio of novel diepoxide mixture to the diepoxide normally producing a rigid polymer is from 0.1 to about 10 parts, preferably 0.5 to 6 parts and particularly a major portion of the former for each part of the latter, by weight. Illustrative of the diepoxy resin comonomer, there can be mentioned: the diglycidyl ether of bis-phenol A as well as the diglycidyl ethers of resorcinol, hydroquinone, pyrocatechol, phloroglucinol, 4,4′-dihydroxybiphenyl and 4,4′-dihydroxydiphenylsulfone. In order to obtain high flexibility together with good tensile strength, the curing agent is preferably a polyfunctional amine, or an aliphatic polycarboxylic acid anhydride. These compositions cure at room or elevated temperatures, e.g., from about 20° C. to 50° C. if a polyfunctional amine is employed as the curing agent, whereas an anhydride curing agent generally requires elevated temperatures to effect the cure such as that of from about 70° C. to 110° C. The polyfunctional amine, i.e., an amine having at least two active amino hydrogen atoms which can be on the same nitrogen atom or different nitrogen atoms is employed in amounts sufficient to provide between about 0.2 and 4.0 amino hydrogen atoms per epoxy group of the mixture, and preferably between 0.5 and 2.0 amino hydrogen atoms per epoxy group, although it is preferable to use the stoichiometric quantity of the polyfunctional amine required to react all the epoxy groups in the mixture. Suitable polyfunctional amines have been recited in the polymerizable compositions of group (1) hereinbefore. Aliphatic polycarboxylic acid anhydrides which can be employed as the curing agent in this group of polymerizable and polymerized compositions include the anhydrides of maleic acid, succinic acid, citraconic acid, itaconic acid, and the like. The amount of anhydride as a curing agent is preferably about the stoichiometric quantity and particularly about 0.85 gram mole of anhydride carboxyl per one gram mole of epoxy. Of course, this can be varied as is generally customary in the art.

The polymers of this invention can be used for much the same applications as the conventional phenolic-based polyepoxide resins, particularly when it is desirable that the polymers have flexibility. They can be used as sealants, adhesives, encapsulating and potting compositions and for fabrication of shock-resistant gaskets.

The following examples are illustrative of the invention.

EXAMPLE (A) Preparation of diol from bis(4-hydroxyphenyl) dimethylmethane and propylene oxide in a ratio of 1 part of the diphenol to 5 parts of the propylene oxide (1:5)

Heat in a sealed tube 91.2 g. (0.4 mole) of Bisphenol A [bis(4-hydroxyphenyl)dimethylmethane], 116 g. (2.0 moles) propylene oxide and 4.4 g. of potassium hydroxide. At 130° C. reaction begins; at this point pressure reaches 160 lbs., rapidly drops to zero as temperature rises to 200° C. The tube was cooled and opened. The syrupy reaction mixture was diluted with ehtylene dichloride. After the addition of water (60 ml.), the pH of mixture was adjusted to 7 with oxalic acid (pH meter). After removal of the aqueous layer the organic layer was dired over sodium sulfate, then filtered and concentrated in vacuo; hydroxyl number 212; molecular weight 529 (theory 518).

(B) Preparation of mixture of diglycidyl ether and monoglycidyl ether

To 125 g. (0.24 mole) of product A above was added 0.3 ml. boron trifluoride etherate. At 70° C. was added 48.1 g. (0.52 mole) of epichlorohydrin dropwise. After the reaction was complete, ethylene chloride (300 ml.) was added and the dichlorohydrin was dehydrohalogenated by the addition of 22 g. (0.55 mole) of flake sodium hydroxide. After dehydrohalogenation for 1 hour at 70° C., the mixture was neutralized with gaseous carbon dioxide and filtered. The filtrate, i.e., the mixture of mono- and diglycidyl ether of the diols prepared in A above, was concentrated in vacuo; oxirane=4.01%; Brookfield viscosity=1440 cps. (25° C.).

(C) Formulation with unmodified mixture of epoxides

A mixture of mono- and diepoxides was prepared in the manner illustrated in (A) and (B) of this example from bis(4-hydroxyphenyl) dimethylmethane, propylene oxide, and epichlorohydrin in a ratio of 1:9:2.2. This mixture of glycidyl ethers had a Brookfield viscosity of 400 cps. at 25° C. and an oxirane content of 2.98%. A panel was prepared from 80 grams of this mixture together with 40 grams of Shell 828 a diglycidyl ether of [bis(4-hydroxyphenyl)dimethylmethane] and 15.5 grams of aminoethylpiperazine. After curing for 16 hours at room temperature and one week at 105° C., tensile strength was 2450 lbs.; elongation 124.5%; hardness (Shore D) 53 and water absorption was 5.6%.

(D) Formulation with reaction product of mixture of epoxides and diisocyanate

The mixture of mono- and diepoxides employed in part (C) above (192.5 grams) was stirred at 120° C. under a vacuum of 1 millimeter pressure for 30 minutes to remove volatiles, it was then cooled to 65° C. under nitrogen. Tolylene diisocyanate (2,4; 2,6) 9.8 grams was added and the mixture was stirred at 80° C. for 30 minutes, then at 120° C. for one hour at atmospheric pressure. The pressure was then reduced to 1 millimeter with continued heating at 120° C. for one hour. The reaction mixture was cooled and analyzed and found to have:

Brookfield viscosity of 11,800 cps. at 25° C.

Oxirane content of 2.81% and hydroxyl content of zero (by infrared analysis).

A panel was prepared from the above diisocyanate modified epoxy composition (67 grams), 33 grams of Shell (Epon) 828 and 12.3 grams of aminoethylpiperazine. The panel had the following properties:

| Cure cycle | Room temp. (7 days) | 105° (7 days) |
| --- | --- | --- |
| Tensile strength (lbs.) | 2,690 | 3,900 |
| Elongation, percent | 101.9 | 83 |
| Hardness (Shore D) | 54 | 70 |
| Water absorption, percent | 1.0 | 2.7 |

(E) Preparation of diisocyanate modified epoxy composition in the presence of stannous octoate catalyst A mixture of epoxides was prepared from Bisphenol A, propylene oxide and epichlorohydrin (1:9:2.2). The product (450 g.) oxirane, 30% was stirred at 120° C. under a vacuum of 3 millimeter pressure for 30 minutes to remove volatiles; it when then cooled to 70° C. under nitrogen. Tolylene diisocyanate (11.2 g.) and 1 ml. of stannous octoate (T-9 catalyst of Metal and Thermit Corp.) were added. The mixture was stirred at 70° C. for 30 minutes then at 120° C. for 30 minutes at atmospheric pressure. The pressure was then reduced to 3 millimeters with continued heating at 120° C. for one hour. The reaction mixture was cooled and found to have a hydroxyl content of zero by infrared analysis. Other properties were as follows:

Oxirane=2.86%;

Brookfield viscosity=12,000 cps. at 25° C.

This material was cured in essentially the same manner as in Example D above yielding approximately the same properties.

(F) Formulation with unmodified mixture of epoxides

A mixture of mono- and diepoxides was prepared from Bisphenol A, propylene oxide and epichlorohydrin, the latter in a ratio of 1:7.0:2.2. This mixture of glycidyl ethers had a Brookfield viscosity of 880 cps. at 25° C. and an oxirane content of 3.15%. A diglycidyl ether of bis(4-hydroxyphenyl)dimethylmethane having a molecular weight of 350–400 (Shell 828) and 16.4 grams of aminoethylpiperazine. After curing for one week at room temperature, tensile strength was 1700 lbs.; elongation 134%, hardness (Shore D) 45, and water absorption was 3.0%.

(G) Formulation with modified mixture of product described in (F)

After treatment with tolylene diisocyanate in the manner described under (D), the reaction product was found to have:

Brookfield viscosity of 4200 cps. at 25° C.;
Oxirane content of 3.11% and a hydroxyl content of zero (by infrared analysis).

A panel was prepared from 80 grams of this modified composition together with 40 grams of a diglycidyl ether of bis(4-hydroxyphenyl) dimethylmethane having a molecular weight of 350–400 (Shell 828) and 16.4 grams of aminoethylpiperazine. After curing for one week at room temperature, tensile strength was 3600 lbs.; elongation 128%, hardness (Shore D) 69 and water absorption was 2.2%.

What is claimed is:

1. A resin composition comprising:
(A) a compound of the formula:

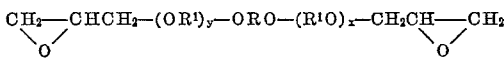

wherein R is the organic residue of a diphenol, $R_1$ is 1,2-ethylene or alkyl substituted 1,2-ethylene having a total of not more than 4 carbon atoms, and each of $y$ and $x$ is an integer of 1 to about 20; and
(B) from about 5% to about 25% based on the weight of (A) of a compound of the formula:

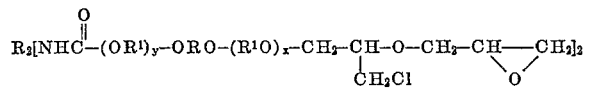

wherein each of R, $R^1$, $x$ and $y$ have the same meaning as in (A), and $R^2$ is the organic residue of an organic diisocyanate.

2. A composition of claim 1 wherein each of $y$ and $x$ is an integer from 3 to about 15 and R is the organic residue of a mononuclear phenol or a dinuclear phenol.

3. A composition of claim 2 wherein $R^1$ is 1,2-propylene, R is the organic residue of bis(4-hydroxyphenyl) dimethylmethane.

4. A composition of claim 3 wherein $R^2$ is the organic residue of tolylene diisocyanate.

5. A resin of improved low-water absorption comprising a composition of claim 1 admixed with an epoxy cross-linking agent.

6. A polymerizable composition comprising:
(A) a compound of the formula

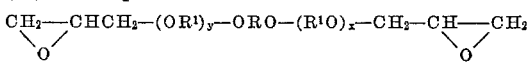

wherein R is the organic residue of a diphenol, $R^1$ is 1,2-ethylene or alkyl substituted 1,2-ethylene having a total of not more than 4 carbon atoms, and each of $y$ and $x$ is an integer of 1 to about 20;
(B) from about 5% to about 25% based on the weight of (A) of a compound of the formula

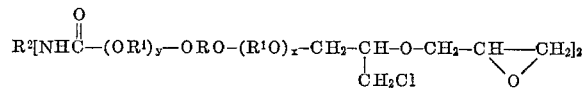

wherein each of R, $R^1$, $x$ and $y$ have the same meaning as in (A), and $R^2$ is the organic residue of a diisocyanate;
(C) a cross-linking agent selected from the class consisting of a polyfunctional amine, dicarboxylic acids and anhydrides thereof and Lewis acids and ether and amine complexes thereof; and
(D) a glycidyl ether having between 1 and 2 oxirane groups per molecule prepared by epoxidizing a polynuclear phenol.

7. A polymerized product prepared by heating the composition of claim 6.

8. A polymerized composition of claim 7 wherein: each of $y$ and $x$ is an integer from 3 to about 15 and R is the organic residue of a mononuclear or dinuclear phenol.

9. A polymerized product of claim 8 wherein $R^1$ is 1,2-propylene; R is the organic residue of bis(4-hydroxyphenyl)dimethylmethane; $R^2$ is the organic residue of tolylene diisocyanate; wherein the cross-linking agent is a polyfunctional amine; and wherein the epoxidized polynuclear phenol is a diglycidyl ether of bis(4-hydroxyphenyl) dimethylmethane.

References Cited

UNITED STATES PATENTS 2,581,464 1/1952 Zech.
3,239,580 3/1966 Pendleton.

MURRAY TILLMAN, Primary Examiner

PAUL LIEBERMAN, Assistant Examiner

U.S. Cl. X.R.

260—47, 78, 831, 834, 835, 836, 837